(12) United States Patent
Bergamo

(10) Patent No.: US 9,966,989 B2
(45) Date of Patent: May 8, 2018

(54) ARRAY ANTENNA SYSTEM AND SPREAD SPECTRUM BEAMFORMER METHOD

(75) Inventor: Marcos Antonio Bergamo, Wellesley, MA (US)

(73) Assignee: Applied Radar, Inc., North Kingstown, RI (US)

( * ) Notice: Subject to any disclaimer, the term of this patent is extended or adjusted under 35 U.S.C. 154(b) by 1466 days.

(21) Appl. No.: 12/253,446

(22) Filed: Oct. 17, 2008

(65) Prior Publication Data
US 2009/0103593 A1    Apr. 23, 2009

Related U.S. Application Data

(60) Provisional application No. 60/999,273, filed on Oct. 17, 2007.

(51) Int. Cl.
| H04B 1/707 | (2011.01) |
|---|---|
| H04B 7/06 | (2006.01) |
| H04B 7/08 | (2006.01) |
| H04J 13/00 | (2011.01) |
| H04J 13/10 | (2011.01) |

(52) U.S. Cl.
CPC .......... *H04B 1/707* (2013.01); *H04B 7/0617* (2013.01); *H04B 7/086* (2013.01); *H04J 13/00* (2013.01); *H04J 13/10* (2013.01)

(58) Field of Classification Search
CPC ...... H04B 1/707; H04B 1/709; H04B 7/0617; H04B 7/086; H04L 27/2647; H04J 13/0022; H04J 13/0003; H04J 13/00; H04J 13/10

USPC ....... 375/130, 140, 141, 142, 147, 148, 149, 375/150, 316, 340, 343; 342/5, 6, 21, 342/147

See application file for complete search history.

(56) References Cited

U.S. PATENT DOCUMENTS

5,552,798 A * 9/1996 Dietrich et al. .............. 343/893
6,980,527 B1 * 12/2005 Liu et al. ...................... 370/280
(Continued)

*Primary Examiner* — Vineeta Panwalkar
(74) *Attorney, Agent, or Firm* — Maurice M. Lynch

(57) ABSTRACT

A method for receiving direct-sequence spread spectrum signals containing a plurality of codes with digital beamforming in a receive array apparatus composed of a plurality of spaced antenna elements coupled to at least one receiver with at least one low noise amplifier, at least one frequency down-converter and at least one analog-to-digital converter and at least one digital signal processing computer or device for said plurality of spaced antenna elements, the method comprising the steps of: receiving said direct-sequence spread spectrum signals in said receive array apparatus, the signals emanating from a plurality of positions or from one or multiple transmitters; multiplying said received signals at each element by a reflecting code to produce reflected signals hereinafter referred to as Element Reflected Signals; combining said Element Reflected Signals forming a common signal for the array; converting said common signal to a convenient intermediary frequency signal; sampling said intermediary frequency-converted signal using said analog-to-digital converter; correlating resulting samples against codes or variations of said codes included in said Element Reflected Signals; demultiplexing said Element Reflected Signals to corresponding signals as received by each of said different array antenna elements using said correlated samples.

42 Claims, 10 Drawing Sheets

(56) References Cited

U.S. PATENT DOCUMENTS

| | | |
|---|---|---|
| 2001/0015999 A1* | 8/2001 | Nam .............................. 375/148 |
| 2004/0095907 A1* | 5/2004 | Agee et al. .................... 370/334 |
| 2006/0262007 A1* | 11/2006 | Bonthron et al. .............. 342/70 |
| 2007/0285308 A1* | 12/2007 | Bauregger .............. G01S 19/10 |
| | | 342/357.27 |
| 2009/0219201 A1* | 9/2009 | Martin .................... G01S 19/23 |
| | | 342/357.62 |

* cited by examiner

Figure 1 - Prior Art for Digitally Controlled Receive Analog Beamforming

Figure 7

ARRAY ANTENNA SYSTEM AND SPREAD SPECTRUM BEAMFORMER METHOD

PREVIOUS APPLICATION

This application claims the priority date of the previously filed non-provisional patent application No. 60/999,273 filed Oct. 17, 2007

FIELD OF THE INVENTION

The present invention relates generally to array antennas with digital beamformers and their use in radar, sensor and communication applications, and particularly to radar, sensor and communication systems using direct sequence spread spectrum signaling and array antennas with digital beamformers using spread spectrum multiplexing within the array system. The apparatus and methods of this invention includes a methods for receiving signals with antenna array gain and methods, devices and techniques for multiplexing the signals within the array apparatus.

BACKGROUND OF THE INVENTION

Prior Art

Antenna Array with Digitally Controlled Analog Beamformer

FIG. 1 illustrates a prior-art exemplary receive array 100 with digitally controlled analog beamformer 190. Typically, the phase shifters at each antenna have high insertion loss and must be preceded by a low-noise amplifier (LNA). The system includes an antenna array 110 with an arbitrary number M of elements 111-119, each element with a dedicated LNA 121-129 and phase-shifter 131-139, and each phase shifter with electronics and interfaces for digital control and calibration. The amplitude and/or phase weights are generated at a control processor 150 and transmitted digitally to the control interface of the phase shifter at each elemental antenna. Actual beamforming occurs at RF—prior to demodulation—as the signals received by each element are phased and added together in the Analog Summation Network 140. The resulting RF signal is then converted to baseband using a down-converter, and then to a discrete-time signal using an analog-to-digital converter and digital receiver 170.

It is well understood that receive array antennas with digitally controlled analog beamformers do not scale well to support multiple beams, as they typically require-one complete analog beamformer including a multi-signal summation network per receive beam. They also do not scale well to higher frequencies, as they require dedicated phase shifter hardware including control interface and calibration support electronics, and dedicated low noise amplifier and power amplifier per element.

Antenna Array with Digital Beamformer

FIG. 2 illustrates a prior-art exemplary antenna receive array 200 using a conventional digital beamformer 290. It includes an antenna array 210 with an arbitrary number M of elemental antennas 211-219, each with a dedicated LNA 221-229, and a conventional digital beamformer system composed of dedicated transceivers 231-239 per antenna element, each transceiver including a down-converter, an analog-to-digital (A/D) converter, and a digital receiver including memory and an interface to a high-speed digital bus 240. The resulting samples received from each transceiver are stored in the Digital Beamformer Processor 280 and, using the beamforming weights generated by the control processor 250, are used to generate the beams 291-299. It is common knowledge that array antennas with conventional digital beamformers-do not scale well to higher frequencies as they require one full digital receiver, including LNA, a down-converter and analog-to-digital converter per element or sub-array, and extensive support for calibrating and synchronizing such receivers.

Conventional phased arrays using element-by-element weighting (amplitude, phase/delay) or digital beamforming (DBF) with a dedicated transceiver (including LNA/PA, up/down frequency converters and A/D and D/A converters) per element do not scale down well in power, real estate area for the electronics, heat dissipation and overall antenna thickness. These conventional antenna solutions do not scale well either to support wideband signals as they worsen the requirements for signal distribution, synchronization, and frequency-conversion, and A/D and D/A speeds.

OBJECTS AND SUMMARY OF THE INVENTION

The overall object of this invention is an array antenna with digital beamforming capabilities that uses a single RF receiver with one low noise amplifier (LNA)/one frequency down converter and one analog-to-digital and digital-to-analog converters for the entire array. The spread spectrum beamformer method performs the multiplexing of signals to/from each array element with minimum hardware at the array elements and enables the implementation of array antennas with receive digital beamforming capabilities that are thin and scales to large arrays and to high frequencies.

Accordingly, the method object of this invention applies to radars, sensors and communication systems equipped with array antennas. One aspect that differentiates this invention from prior art as applied to digital beamforming is the method of using direct-sequence spread spectrum for multiplexing the per-element received signals inside. This enables received digital beamforming with capability and performance comparable to or better than array antennas using prior art digital beamforming technologies with the advantage that, contrary to prior art, the array antennas DO NOT require a digital transceiver including LNA frequency down-converter and analog-to-digital digital-to-analog converters at each array element or sub-array and, as a result, are simpler to design, manufacture and test; scale up in frequency and in number of elements; scale down in power, weight, thickness and heat dissipation.

One aspect that differentiates the invention from prior art using digitally controlled analog beamforming methods is that it DOES NOT require the use of a low noise amplifier or power amplifier, phase or delay devices, calibration support and control interface per element or sub-array. Another aspect that differentiates the receive array apparatus and methods object of this invention from prior art using receive digital beamforming methods, including methods that uses time division multiplexing to collect data from the array elements, is that is DOES NOT require a dedicated digital receiver including low noise amplifier, down-converter, analog-to-digital converter, memory devices, calibration support, synchronization support and high-speed digital interface per element or sub-array.

In general, in one aspect included in the preferred embodiment, the required devices per element can be mounted directly at or immediately behind each antenna element, including a patch.

Receive Beamforming

It is an object of this invention that, when receiving, incident signals at each element are enabled to be multiplexed directly at the frequencies in which they are received, and then extracted without mutual interference while being subject to negligible noise-relate performance degradation. This enables the implementation of low-profile receive array antennas as the low noise amplifier and the digital receiver electronics including down-converter and analog-to-digital converter can be placed remotely from the actual antenna array elements.

Another object of this invention is the spread spectrum receive beamforming method comprising the steps of receiving a first set of direct-sequence spread spectrum signals from multiple positions including from a multiplicity of transmitters while using a receive array apparatus composed of spaced elements; reflecting such received spread spectrum signals at each element using a different set of spread spectrum signals including random sequences and pseudo-noise sequences or codes that unique for each element or sub-array; combining such reflected signals by each element forming an aggregate signal for the array; converting such an aggregate signal to a convenient intermediary frequency including baseband; sampling such a frequency-converted signal generating a spread spectrum discrete-time signal suitable for digital signal processing; correlating such a spread spectrum discrete-time signal against pseudo-noise sequences or codes derived from the pseudo-noise sequences or codes included in the reflected signals, generating for each element a time-domain discrete-time signal with spread spectrum processing gain that includes both angular and temporal information as received at each element and suitable for spatial demultiplexing and related receive beamforming; operations including detecting targets and determining angle-of-arrival of corresponding target reflected signals; receive digital beamforming including the use of such angular information or corresponding angle-of-arrival hypothesis while achieving array gain including spatial isolation among incident signals; and signal detection using included temporal information while achieving time-and-frequency ambiguity resolution comparable or better than prior-art receive arrays using prior-art analog or digital beamforming techniques, and additional performance gain from multipath or multiple-input/multiple-output (MIMO) information included in the received signals.

In summary, the invention comprises a receive system.

The receive system includes a receive array apparatus integrated with a method for generating direct-sequence spread spectrum signals comprised of a multitude of pseudo-noise sequences including maximal-length sequences with different cyclic shifts, and a method for receiving such spread spectrum signals from different positions including a multiplicity of transmitters at different locations while subjected to reflections from stationary obstacles and moving objects; generating at the array reflected signals at the same carrier frequency as the incident signal while using reflecting signals with distinguishable temporal and spectrum features at each array element; combining such reflected signals into a common aggregate radio-frequency signal for the array using either wired or wireless means; converting the aggregate radio-frequency signal to a convenient intermediate frequency including baseband while using a single low noise amplifier and down-converter for the entire array; sampling the resulting aggregate baseband signal while using a single analog-to-digital converter operating at least at the Nyquist rate of the received signals; correlating such an aggregated baseband signal against sequences or variations thereof included in the aggregate radio-frequency signal while capturing angle-of-arrival and multipath information and achieving spread spectrum processing gain and multipath gain; and performing joint beamform and detection to estimate signals, data or parameters included in the incident signals including spatial nulling of a subset of such incident signals while achieving receive array gain. The resulting receive system apparatus and methods enable receive digital beamforming with capability and performance comparable to or better than receive arrays using prior art digital beamforming technologies with the advantage that, contrary to prior art, they DO NOT require a digital transceiver including LNA, down-converter and analog-to-digital converter at each element and, as a result, are simpler to design, manufacture and test; scale up in frequency and number of elements; scale down in power, weight, thickness and heat dissipation.

BRIEF DESCRIPTION OF DRAWINGS

FIG. 7 shows an example of a spread spectrum reflecting code matrix that provides the shift-phase of the reflected spread spectrum signal for every given shift-phase of the reflecting spread spectrum sequence used at the array element.

DETAILED DESCRIPTION OF THE PREFERRED EMBODIMENT

The objects of the invention include a receive array apparatus and receive beamforming methods, and a transmit array apparatus and transmit beamforming methods. FIGS. 3 through 10 apply to the receive system using spread spectrum Receive Array System In general, the receive array object of this invention includes a wireless or a wired means for combining the signals reflected at each element while generating a single multi-level direct-sequence spread spectrum aggregate signal at the carrier frequency for the array.

Figure 1:
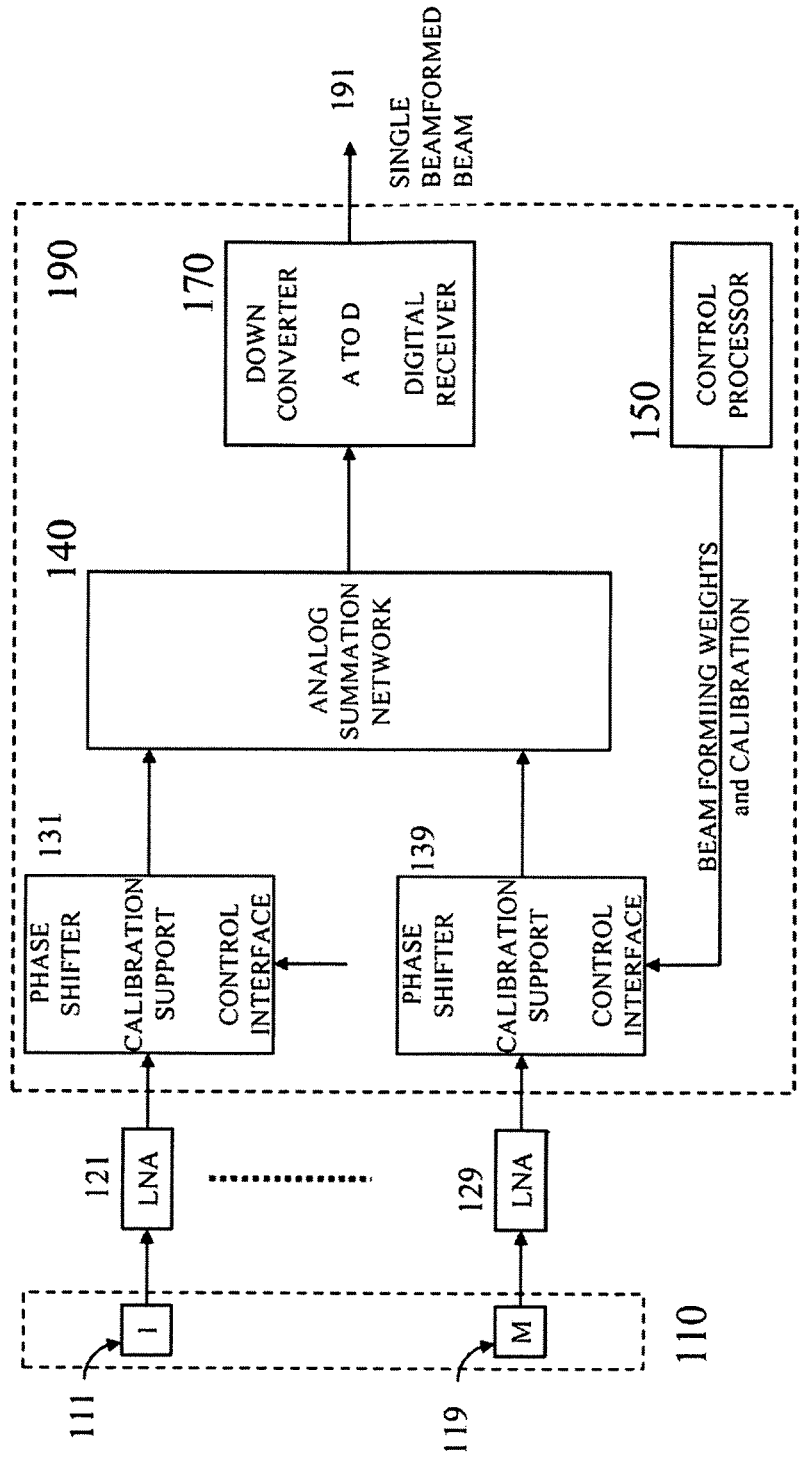
FIG. 1 shows a prior art example implementation of a receive array antenna apparatus using prior-art digitally controlled analog beamforming technology that requires a low noise amplifier and a phase shifter with associated control interface logic per receive element of the array.
Figure 2:
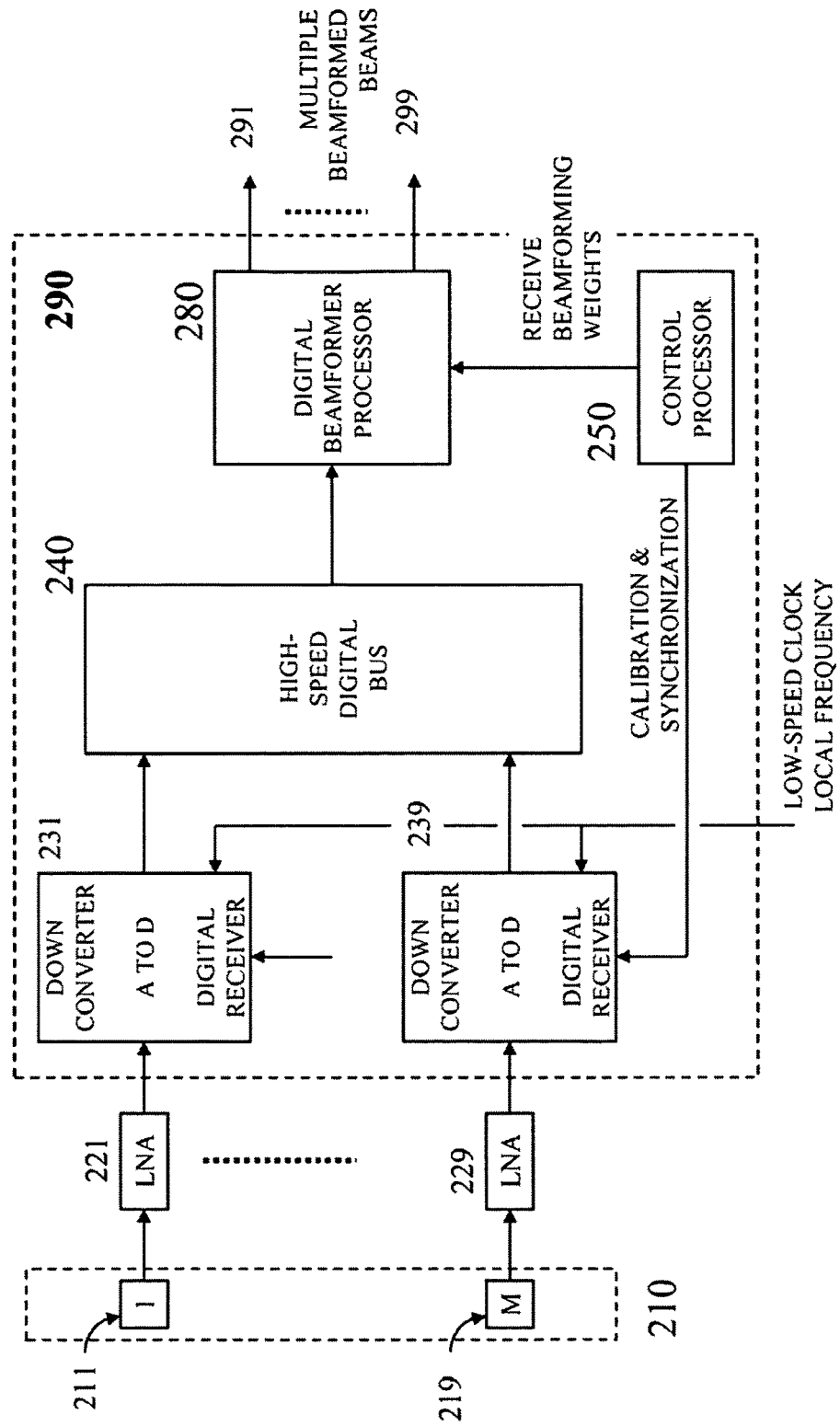
FIG. 2 shows a prior art example implementation of a receive array antenna apparatus using prior-art conventional digital beamforming technology which requires, in addition to a low noise amplifier, a full digital receiver per receive element, including down-converter, analog-to-digital converter and a digital receiver with an interface to a high-speed digital bus and associated synchronization and control interface logic per receive element of the array.
Figure 3:
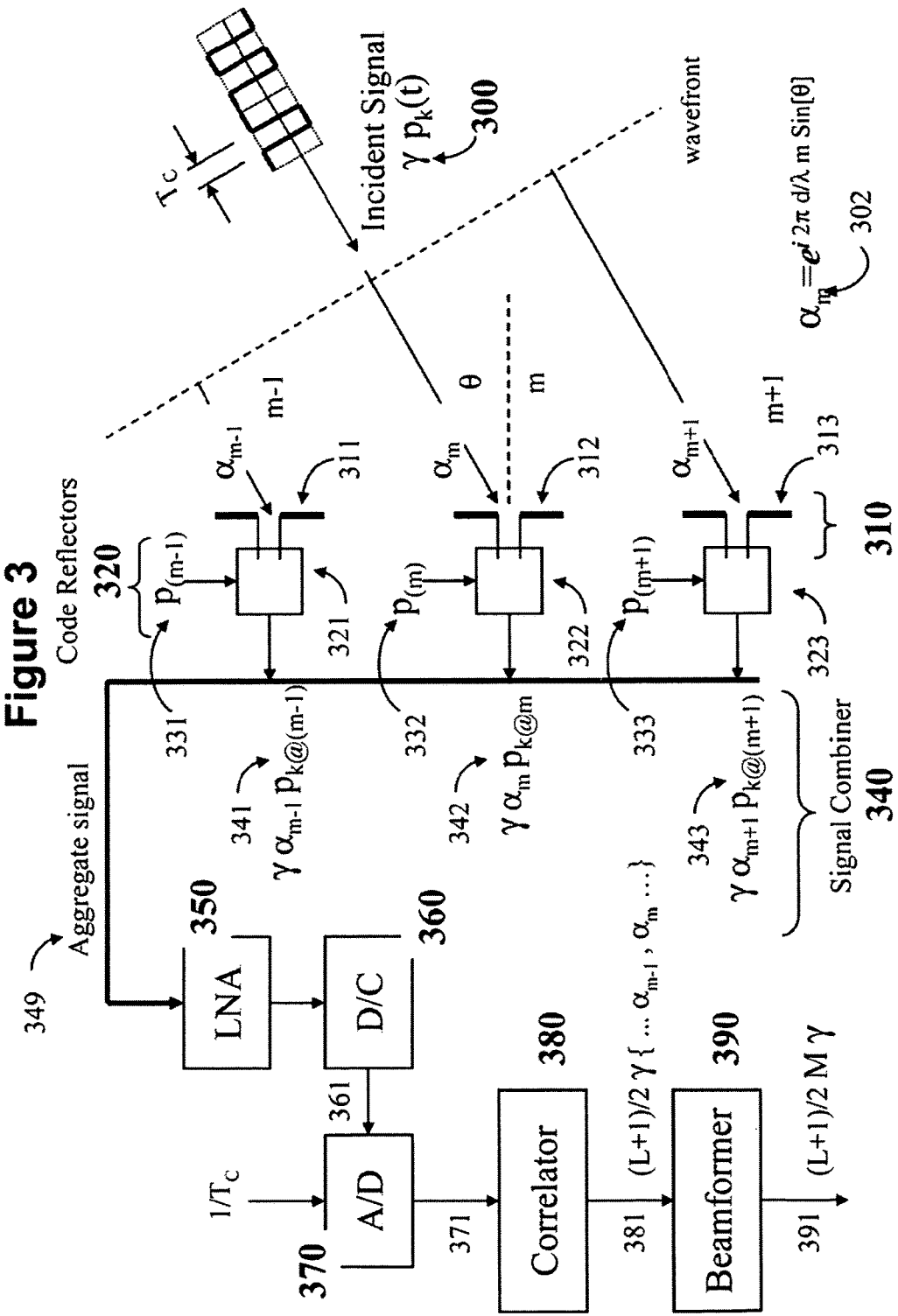
FIG. 3 shows an example implementation of a receive array antenna system using the spread spectrum digital beamforming technology object of this invention in which the signals collected at each antenna element are 'reflected' by a pseudo-noise sequence unique to each element, multiplexed using a wired combiner, and processed using a single digital receiver for the entire array including a single low noise amplifier, down converter, analog to digital converter, correlator and beamformer.
Figure 4:
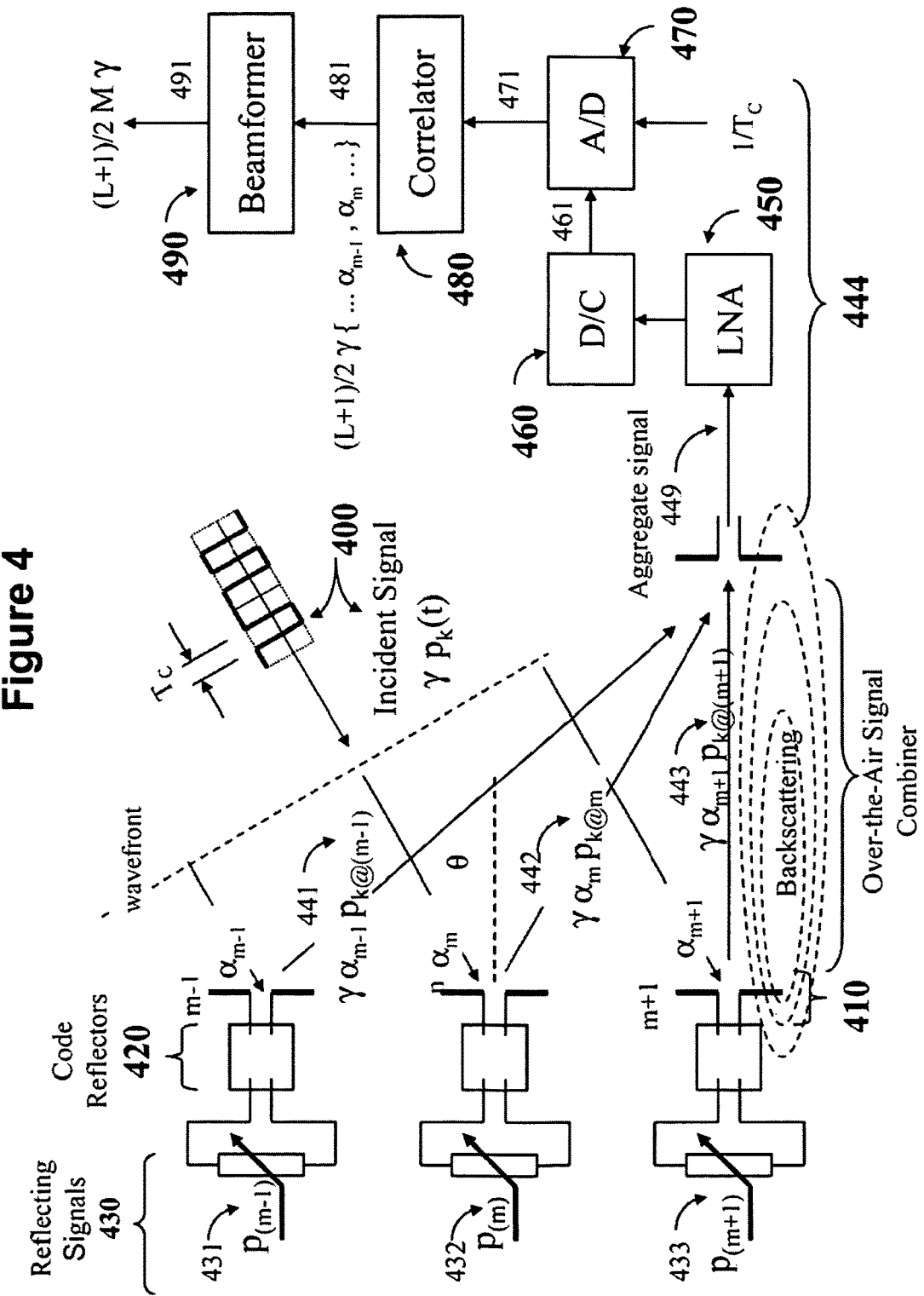
FIG. 4 shows an alternative example implementation of a receive array antenna system using the spread spectrum digital beamforming technology object of this invention in which the signals collected at each antenna element are 'reflected' through backscattering using a load which impedance is modulated by a pseudo-noise sequence unique to each element, combined wirelessly as the signal propagates towards the digital receiver, and processed using a single digital receiver for the entire array, such a digital receiver including a single low noise amplifier, down converter, analog to digital converter, correlator and beamformer.
Figure 5:
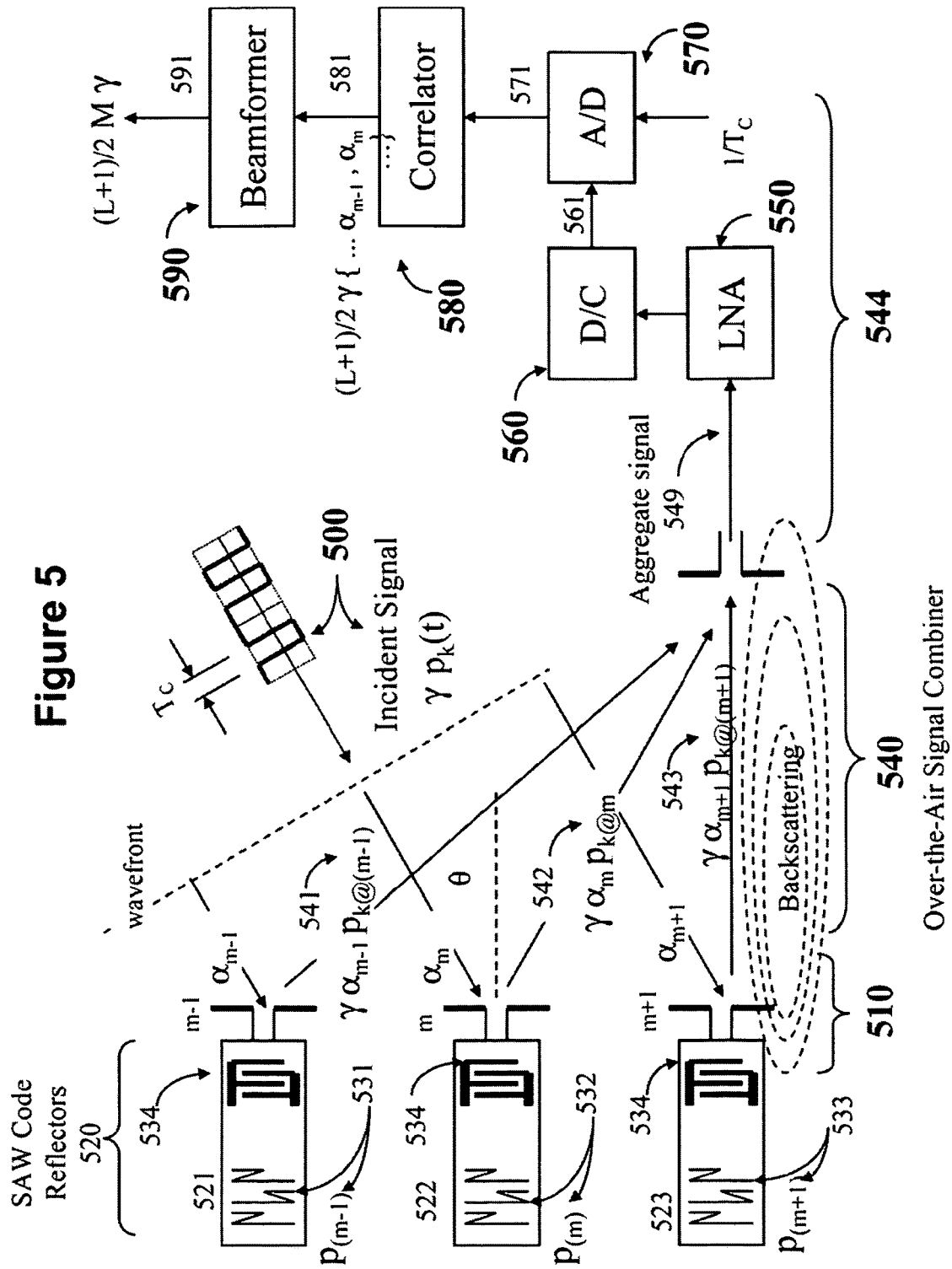
FIG. 5 shows an alternative example implementation of a receive array antenna system using the spread spectrum digital beamforming technology object of this invention in which the signals collected at each antenna element are 'reflected' through backscattering using a surface acoustic device (SAW) with reflectors that implement a pseudo-noise sequence unique to each element, combined wirelessly as the signal propagates towards the digital receiver, and processed using a single digital receiver for the entire array, such a digital receiver including a single low noise amplifier, down converter, analog to digital converter, correlator and beamformer.
Figure 6:
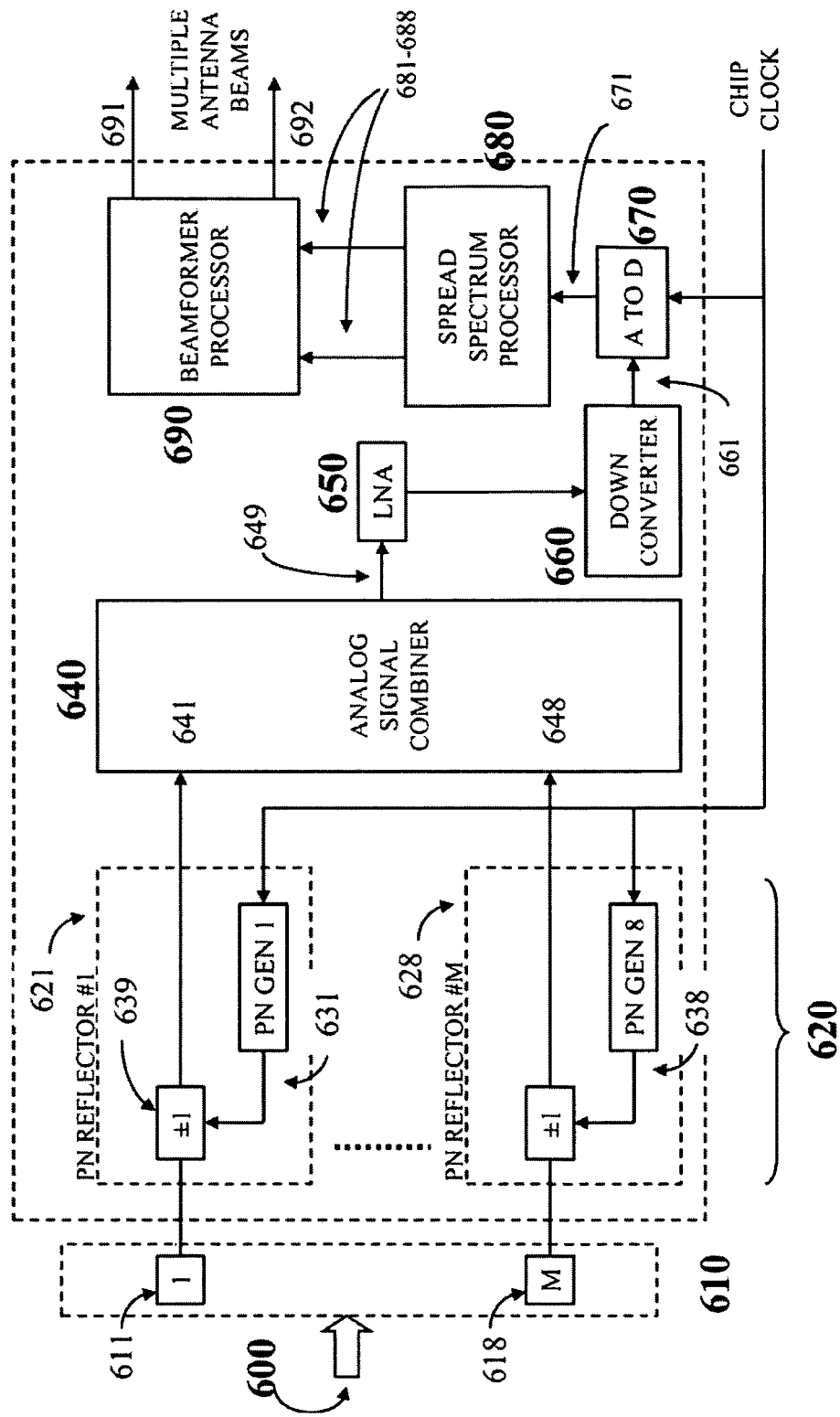
FIG. 6 shows an example implementation of a receive array antenna apparatus using the spread spectrum digital beamforming technology object of this invention in which the signals collected at each antenna element are 'reflected' by a pseudo-noise sequence unique to each element, multiplexed and processed by using a single digital receiver for the entire array, such a digital receiver including a single low noise amplifier, down converter and analog to digital converter.
Figure 7:
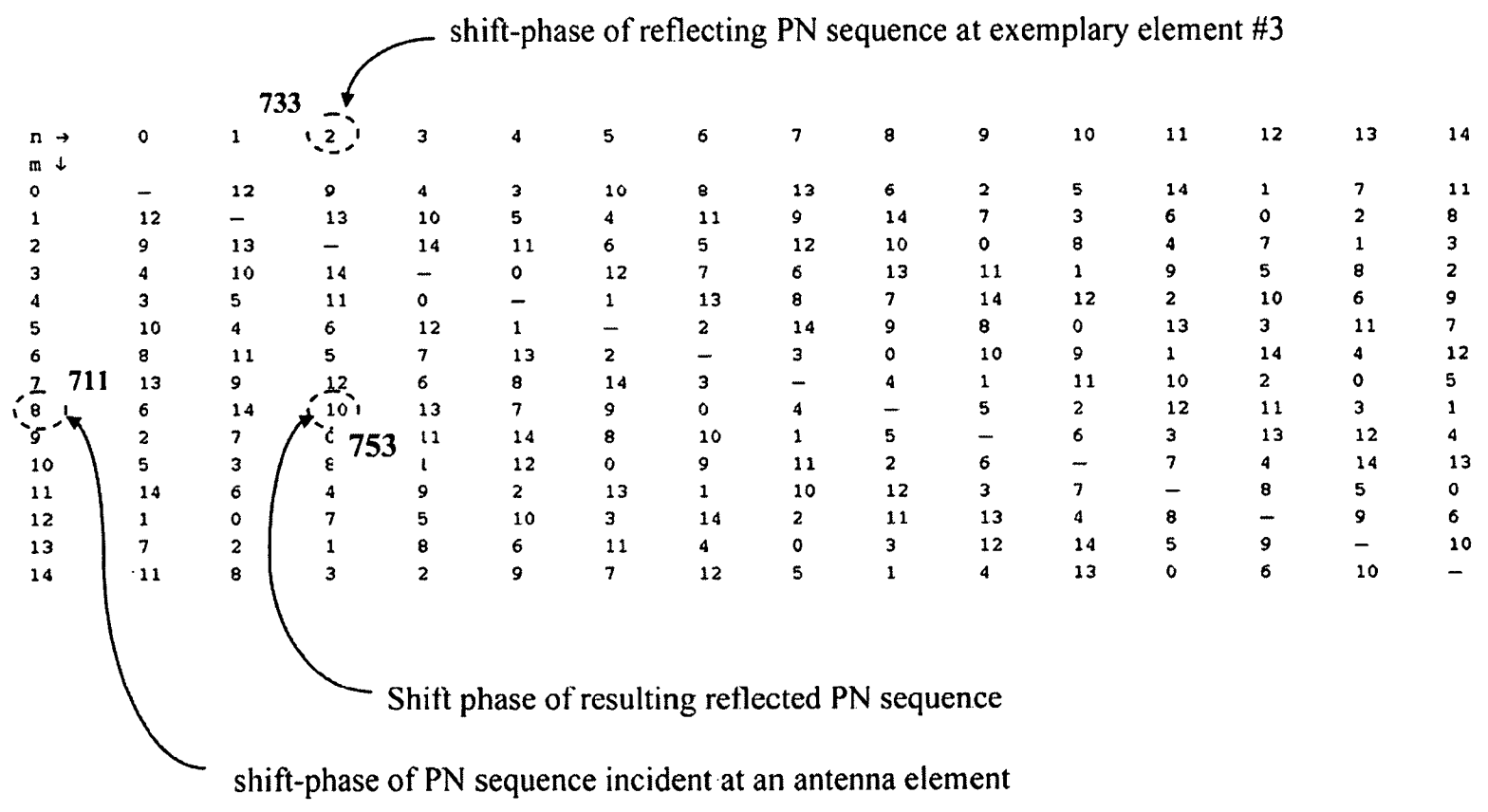
Figure 8:
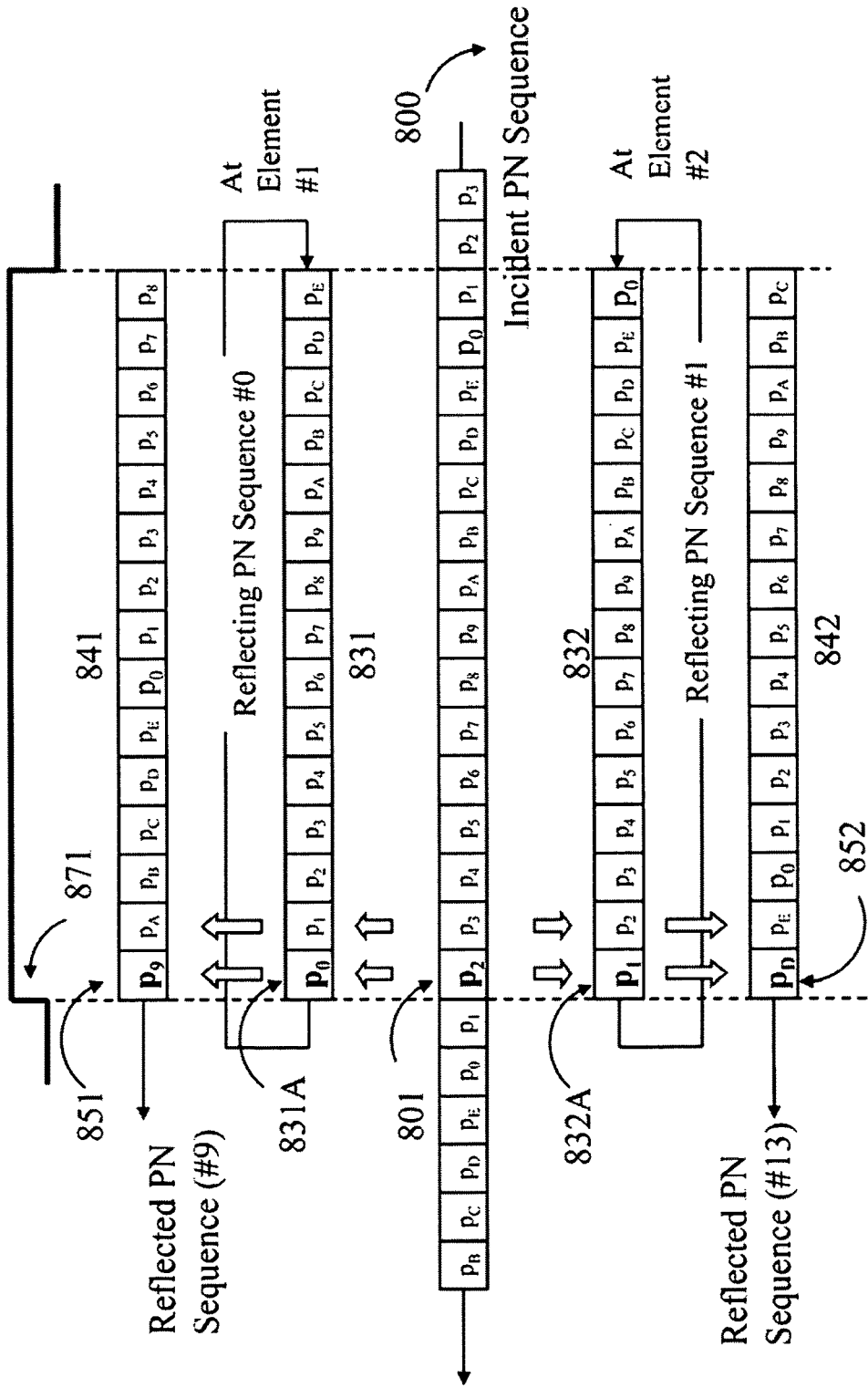
FIG. 8 shows exemplary spread spectrum code reflections at two exemplary antennas for an incident spread spectrum signal received chip-level synchronized with the reflecting codes.
Figure 9:
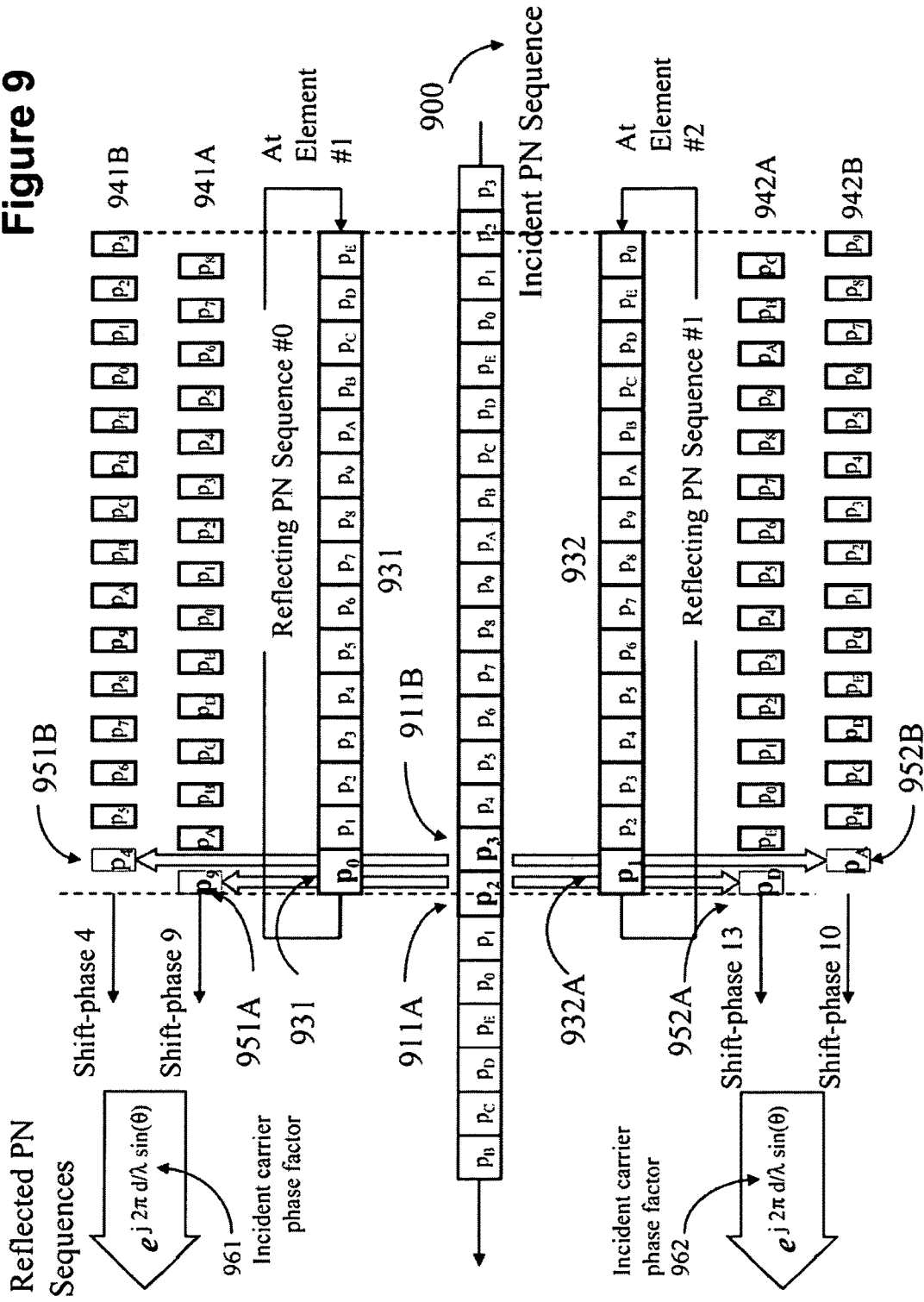
FIG. 9 shows exemplary spread spectrum code reflections at two exemplary antennas when the incident signal is received without chip-level synchronization with the reflecting codes.
Figure 10:
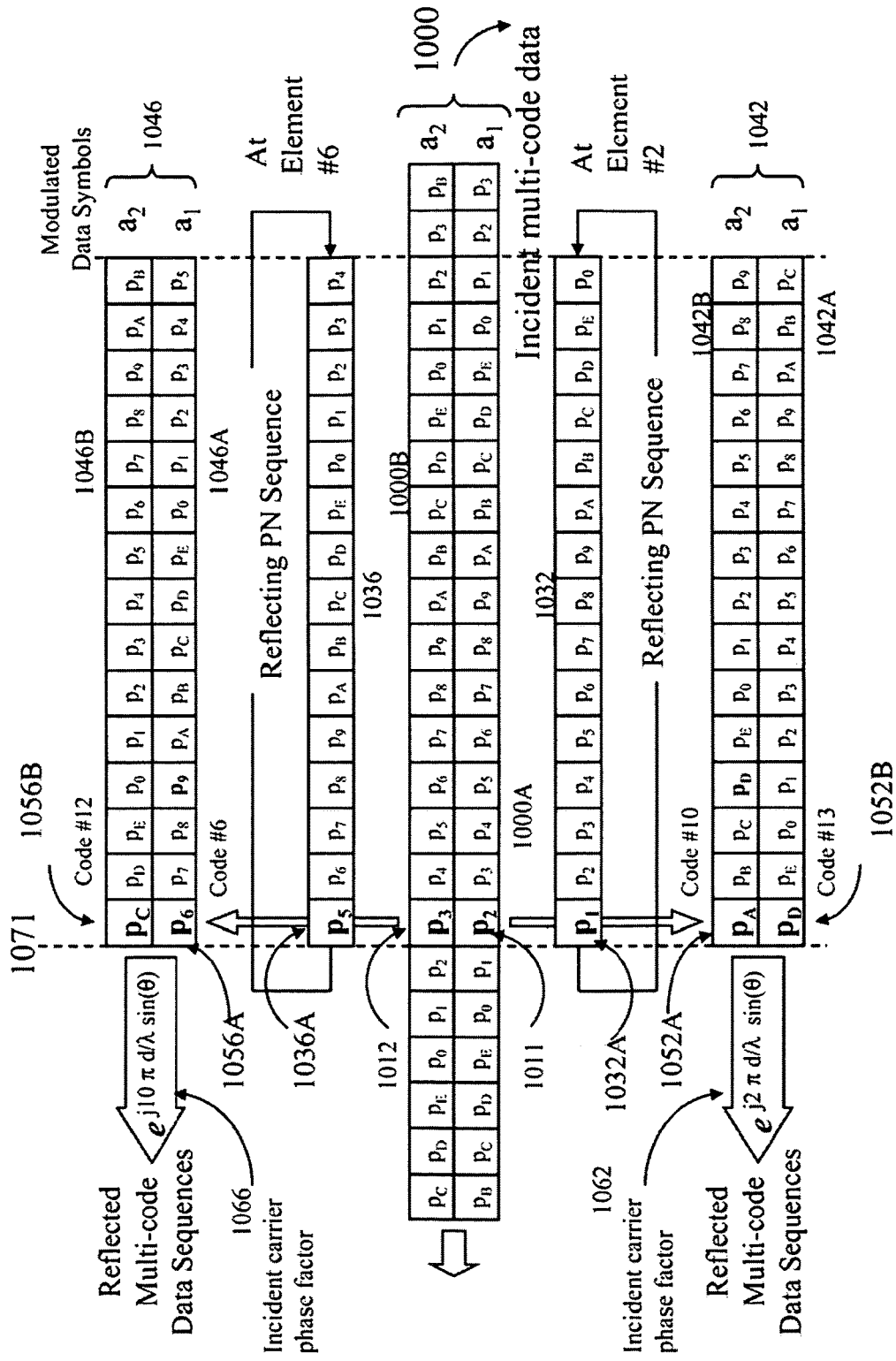
FIG. 10 shows an exemplary spread spectrum code reflections at two exemplary antennas for an incident signal containing multiple spread spectrum codes (i.e., a multi-code encoded spread spectrum signal) when the incident signal is received synchronized with the reflecting codes.

FIG. 3 illustrates a receive array with a wired signal combiner in which the reflected signals result from the multiplication of the reflecting signal at each element with the incident signal. FIG. 4 illustrates a receive array with an alternative wireless signal combiner in which the reflected signals result from backscattering including direct-at-RF bi-phase re-modulation of the incident signal at each element and in which the reflecting signal at each element is used to control the impedance or load at such an element. FIG. 5 illustrates a receive array using the wireless signal combiner in which the reflected signals result from backscattering using SAW devices at each element, each SAW device with acoustic wave reflectors that implement the reflecting signal for such element. FIG. 6 illustrates the receive array including a block diagram of the code reflectors. FIG. 7 illustrates the cyclic shift phase of codes that result from the multiplication (i.e., reflection) of an incident code signal by a reflecting code. FIG. 8 illustrates an exemplary reflected signal that result when the incident code signal is chip-level synchronized with the reflecting codes. FIG. 9 illustrates the same reflection as in FIG. 8 when at least one of the incident signals is not chip-level synchronized with the reflecting codes. FIG. 10 illustrates the resulting reflected signals when the incident signal is itself composed of a multitude of code signals, each code signal with a different cyclic shift phase of a common base sequence.

Receive Array with a Wired Signal Combiner

FIG. 3 depicts the receive array which includes exemplary array antenna 310 with 'M' elements and exemplary elements 311-313. The exemplary incident signal 300 includes a direct-sequence spread spectrum signal $p_k(t)$ received with cyclic shift-phase 'k' relative to the common epoch of the pseudo-noise sequences included in the reflecting signals including exemplary pseudo-noise reflecting sequences 331-333 with exemplary cyclic shift-phases (m−1) through (m+1), each cyclic shift-phase corresponding to one chip delay with duration $T_C$ seconds. In the preferred embodiment, the pseudo-noise sequences included in the incident and reflecting signals result from different cyclic shifts of a common maximal-length sequence used as base sequence. The exemplary reflected signals 341-343 result from the multiplication of the incident signal 300 as received at each element with the corresponding reflecting signals 331-333. It is of common knowledge that the multiplication of two pseudo-noise sequences $p_k$ and $p_m$ from the same family of maximal-length sequences with exemplary—and different—cyclic shift-phases 'k' and 'm' relative to a base sequence $p_0$ result in a third maximal-length sequence $p_{k@m}$ from the same family having a third different shift-phase 'k@m' where the symbol '@' represents a cyclic shift-phase reflecting operation. It is apparent that the reflected signal at each element #m contain the amplitude 'γ' included in the incident signal and the relative phase factor $\alpha_m = \exp[j\, 2\pi\, d/\lambda \sin[\theta]]$ 302 for element #m, in which 'θ' is the incident angle, λ is the carrier wavelength and d is the distance between elements. The aggregate signal 349 results from the addition of such reflected signals while using a wired signal combiner using a cable or preferably a microwave signal combiner such as a Wilkinson combiner. In general, the aggregate signal includes additional phase, delay and amplitude variation that result from the interface with and propagation of each component signal in the combiner. In the preferred embodiment, the aggregate signal is received by a single digital receiver composed of a single low noise amplifier 350, a single down-converter 360, and a single analog-to-digital converter 370 operating at the Nyquist rate '1/Tc' or higher of the exemplary aggregate signal. The output of the down-converter 361 is at baseband and corresponds to the complex envelope of the aggregate signal. The output of the analog-to-digital converter 371 is the discrete-time version of such baseband signal and includes samples of both the in-phase and quadrature-phase components of the aggregate signal. In general, the down-converter can be implemented in stages including a last stage implemented in software including sampling and analog-to-digital conversion implemented at a convenient intermediary frequency. In the correlator 380, this discrete time baseband signal is correlated against all pseudo-noise sequences included in the reflected signals including corresponding base sequence with every possible cyclic shift. It is of common knowledge that maximal-length sequences ARE NOT truly shift orthogonal as they have a non-zero off-phase cyclic auto-correlation. In the preferred embodiment using maximal-length sequences, such an orthogonalization is achieved by using a variation of the maximal length sequences when performing the correlation operations, such a variation resulting from using for each cyclic shift just the chip positions corresponding to positive values of the resulting shifted maximal-length sequence. In the exemplary case of FIG. 3 in which the incident signal includes a single pseudo-noise sequence with shift-phase 'k', the reflected signal from an element with reflecting signal using shift-phase 'm' results with a shift-phase 'k@m'. In the case illustrated in FIG. 3 in which the chips of the incident signal 300 are synchronized with the chips of the reflecting signals 331-333, there is a one-to-one correspondence between each antenna element 311-313 and a corresponding detected signal position at the output of the correlator. Specifically, the correlator output 381 corresponding to element number 'm' for an incident signal with shift-phase 'k' results at position 'k@m' with spread spectrum processing gain $(L+1)/2$ while having a complex-valued amplitude that include the complex-valued amplitude 'γ' of the incident signal and the phase factor $\alpha_m$ for the element number 'm'. In this case, in which the incident signal is composed of a single pseudo-noise sequence and the resulting correlation operations are orthogonal for different cyclic shifts, the beamformer 390 uses conventional beamforming methods and weights to generate the beamformed signal 391 with array gain 'M' including placing antenna nulls (i.e., null steering) as desired, including nulls toward selected incident signals including signals from jammers.

Receive Array with a Wireless Signal Combiner

FIG. 4 depicts the receive array 400 using a wireless signal combiner in which exemplary reflected signals 441-443 are generated using a switched-load modulation method controlled by the reflecting signals 431-433 in which a load with an impedance including short and open selected such to maximizes signal reflection through backscattering. In the preferred implementation, using binary reflecting signals, including reflecting signals derived from a base sequence that is a maximal-length sequence with chip values '±1', such a differential delay is set to 180° corresponding to one half of the carrier wavelength. As it well understood, the reflected signals propagate through backscattering from the elements to a common receiver 444 located somewhere else generating the aggregate reflected signal 449, such a receiver including the receiving devices 450-490 and using the amplification, down-converting, correlating and beamforming methods as described in conjunction with FIG. 3.

FIG. 5 depicts the receive array 510 which also uses a wireless combiner, the exemplary reflected signals 541-543 for an incident signal 500 are generated using surface acoustic wave (SAW) devices, 521-523, which include an inter-digital transducer (IDT) 534 which converts electromagnetic waves into acoustic waves using piezoelectric effects and a set of wave reflectors 531-533. The configuration of these wave reflectors varies from element to element such as to produce reflecting structures that correspond to the exemplary reflecting codes '$p_{(m-1)}$' through '$p_{(m+1)}$' and generate reflected signals with characteristics as described in conjunction with FIGS. 3 and 4. As in the system of FIG. 4, these reflected signals propagate through backscattering 540 from the elements to a common receiver 554 located somewhere else while producing the aggregate reflected signal 549, such a receiver including the receiving devices 550-590 and using the receiving and processing methods as described in conjunction with FIGS. 3 and 4.

Preferred Embodiment Using a Wired Signal Combiner

FIG. 6 illustrates an exemplary antenna array apparatus 610 using the preferred embodiment for the spread spectrum beamformer method object of the invention. In general, the incident signal 600 includes a multitude of maximal-length sequences from a common base sequence with different cyclic shifts. The receive array apparatus includes an antenna array 610 with an arbitrary number M of element antennas 611-618, each with dedicated code reflectors 620, each code reflector 621-628 including a shift register 'PN GEN 1' through 'PN GEN 8' used to generate the a maximal length reflecting sequence 631-638, a device 639 such as a mixer or quadrature hybrid such as a Lange coupler used in conjunction with a switched load that includes 'short' and 'open' to multiply including modulate the received signal by the generated maximal-length sequence, and an interface to an analog signal combiner 640 such as a Wilkinson combiner used to aggregate the reflected signals 641-648 reflected at each element. In the preferred embodiment, the aggregate signal 649 is received by a single digital receiver composed of a single low noise amplifier 650, a single down-converter 660, and a single analog-to-digital converter 670 operating at the exemplary Nyquist rate (1/Tc) or higher of such an aggregate signal. The output of the down-converter 661 is at baseband and corresponds to the complex envelope of the aggregate signal 649. The output of the analog-to-digital converter 671 is the discrete-time version of such baseband signal and includes samples of both the in-phase and quadrature-phase components of such an aggregate signal. This discrete time signal is correlated against the corresponding base sequence including every possible cyclic shift. The detected signals 681-688 at the output of the correlator 680 result with spread spectrum processing gain and includes information of the data included in the transmitted signals as well as information of the relative phase and amplitude in which each the incident signal 600 is received at each element 611-618. These relative phase and amplitude are used by the Beamformer Processor 690 to jointly perform the spatial demultiplexing of a multitude of signals incident at the array from different angular directions or antenna beams 691-192, including performing joint detection and beamforming of multiple data included in each incident signal included in each antenna beam.

Reflected Codes with Maximal-Length Sequences

FIG. 7 illustrates the cyclic shift-phase relationship between incident, reflecting and reflected signals for an exemplary maximal-length sequence with length 15 in which each row corresponds to a code with exemplary cyclic shift-phase 711 of the incident signal, each column corresponds to a code with exemplary cyclic shift-phase 733 of the reflecting signal at an exemplary element, and each row-column intersection corresponds to the code with exemplary cyclic shift-phase 753 of the corresponding reflected signal.

In general, in one aspect relevant for the orthogonality of the correlation operations, the codes or relative cyclic shift-phases of pseudo-noise sequences included in the reflecting signals are selected such as to be different from the codes or relative shift-phases included in the incident signals, such shift-phases or codes being defined relative to a referential time-epoch in which the samples corresponding to such incident pseudo-sequences are first sampled and then selected for processing using the correlation operations.

Spread Spectrum Multiplexing with Chip-Level Synchronization

FIG. 8 illustrates an exemplary direct-sequence spread spectrum pseudo-noise sequence incident signal 800 being reflected at two exemplary elements #1 and #2 while using exemplary reflecting signals 831 and 832 with cyclic shift-phases 831A and 832A respectively, in which such cyclic shift-phases are defined relative to a referential time or code epoch 871. In the example, the cyclic shift-phase 801 of the incident signal relative to such referential time-epoch is '2'; the cyclic shift-phase 831A of the reflecting signal 831 for element #1 is '0', and the cyclic shift-phase 841A of the resulting reflected signal 841, corresponding to the value in the intersection of row#3 and column #1 in the table of FIG. 7, is '9'. Similarly, the cyclic shift-phase 832A of the reflecting signal 832 for element #2 is '1' and the cyclic shift-phase 842A of the corresponding reflected signal 842, corresponding to the value in intersection of row#3 and column #2 in the table of FIG. 7, is '13' (or 'D' in hexadecimal).

Spread Spectrum Multiplexing without Chip-Level Synchronization

In general, the incident signal includes at least one pseudo-noise sequence or code that is not synchronized at the chip-time level with the referential-time epoch of the receive array. FIG. 9 illustrates an exemplary case of such a non-synchronized incident signal 900 composed of a single pseudo-noise sequence including cyclic padding. As in the example of FIG. 8, such an incident signal is reflected by the exemplary reflecting signals 931 and 932 each with cyclic shift-phases 931A (with cyclic shift-phase '0' at element #1) and 932A (with cyclic shift-phase '1' at element #2) respectively. In this case, and as illustrated in the figure, each element generates a pair of reflected signals 941A/B and 942A/B, each with different cyclic shift-phase offsets 951A/B and 952A/B corresponding respectively to cyclic shift-phases '9' and '4' at element #1, and cyclic shift-phases '13' ('D" in hexadecimal) and '10' ('A' in hexadecimal) at element #2. As in the example of FIG. 8, the cyclic shift-phase values of the reflected signals are determined by shift-and-add reflecting properties of the maximal-length sequences summarized in the table of FIG. 7. The power of each reflected signal varies a function of two parameters: (1) the fractional-chip time-offset between the pseudo-noise sequences included in the incident signal and the pseudo-noise sequence of each reflecting signal; (2) the overall impulse response (not shown) of the transmit-receive channel for each antenna element including filtering effects of the antenna elements themselves, filtering effects added during transmission, and filtering effects of additional active and passive circuitry used between each antenna element and the output of the signal combiner. In general, in one aspect that is relevant for beamforming, both the relative synchronization offset and the relative carrier phases 961 and 962 in which the signal incident with an exemplary angle 'θ' with respect to the boresight of the array is received at each element are used to determining the beamforming weights used generate the beamformed signal or signals toward specific incident angular directions, including nulls and/or determining the beamforming/detecting matrix used to jointly beamform and detect data or other information-bearing parameters included in the incident signal 900.

Support for Spread Spectrum Signals with Multiple Codes

The methods of the invention include support for spread spectrum incident data signals with multi-code data encoding. FIG. 10 illustrates an exemplary receive array with a signal 1000 incident at an angle 'θ' and including two superposed exemplary pseudo-noise sequences with different cyclic shift-phases 1011 and 1012, each used to 'spread' different exemplary sensors samples or modulated data symbols $a_1$ and $a_2$. Also illustrated are the reflecting signals 1032 and 1036 with cyclic shift-phases 1032A and 1036A respectively at two exemplary elements '#2' and '#6'. As in the example of FIG. 8 using maximal-length sequences, each of such incident pseudo-noise sequence generates at each element a reflected signal with cyclic shift-phase as specified in FIG. 7. Specifically, at element #2 using a reflecting signal 1032 with shift-phase 1032A (actually '1'), the incident pseudo-noise sequence 1000A with cyclic shift-phase 1011 (actually '2') produces a reflected signal 1042A with cyclic shift-phase 1052A (actually '13' or 'D' in hexadecimal) while the other pseudo-noise sequence 1010B with shift-phase 1012 (actually '3') produces a reflected signal 1042B with shift-phase 1052B (actually '10' or 'A' in hexadecimal). The resulting reflected signals at element #2 include a phase factor in the form of a complex-valued amplitude 1062 that captures the relative phase in which the carrier is received at element #2 relative to element #1 (not shown). Similarly, for element #6, using a reflecting signal 1036 with shift-phase 1036A (actually '5'), the incident pseudo-noise sequence 1000A with shift-phase 1011 (actually '2') produces a reflected signal 1046A with shift-phase 1056A (actually '6') while the other pseudo-noise sequence 1000B with shift-phase 1012 (actually '3') produces a reflected signal 1046B with shift-phase 1056B (actually '12' or 'C' in hexadecimal). The resulting reflected signals at element #6 include a phase factor in the form of a complex-valued amplitude 1066 that captures the relative phase in which the carrier is received at element #6.

In general, the set of reflected signals at different elements resulting from incident signals with code division multiplexing including multiple superposed pseudo-noise sequences with different cyclic shift-phases, will result with different spatial-temporal signatures in which the spatial-temporal signature for each element includes the set of cyclic shift-phases included in the corresponding reflected signals and the complex-valued amplitude including relative carrier phase in which each multi-code incident signal is received at such an element. Using prior-art technologies including prior-art of multiple-input/multiple-output (MIMO) systems, it is well understood that such a set of different spatial-temporal signatures can be used for the demultiplexing of incident signals resulting from multiple transmitters and alternatively (or jointly), for detecting multiple modulated data included in the incident signals resulting from each transmitter. It is also well understood in such prior art technologies that the mutual correlation among the spatial-temporal signatures can greatly impact the performance of such demultiplexing and detection operations. In the preferred embodiment, the reflecting sequences at each antenna element are multiplied by a fixed but otherwise random sequence of constants including the values ±1 such as to maximize the signal-to-noise-plus-interference ratio (SNIR)

of the signal detection methods, including methods for detecting signals with multiple-input/multiple-output (MIMO) characteristics.

The following paragraphs summarize features and characteristics of signals, devices or apparatus included in the preferred implementation.

Received Signals

The following applies to signals that are received by the array antenna with spread spectrum beamformer object of this invention. In general, the signals incident at the receive array include spread spectrum signals from one or multiple transmitters or reflected from multiple targets located at different positions:

- In one aspect included in the preferred embodiment and relevant for radar, communications and sensor applications, each of such incident signals may include multipath components resulting of reflections from field or urban structures such as mountains and buildings;
- In one aspect included in the preferred embodiment and relevant for radar tracking multiple targets at different positions, each of incident signals may result from a multitude of stationary or moving object such as airplanes in multiple locations;
- In one aspect included in the preferred embodiment and relevant for fine time-and-frequency ambiguity resolution, the spread spectrum encoding of incident signals may be include chips, each chip composed of one or a multitude of short duration pulses;

Reflecting Signals

The following applies to the reflecting signals used inside the receive array in conjunction with the spread spectrum beamformer object of this invention. In general, the receive array include spaced elements, each element with an apparatus to reflect the incident signal using a different reflecting signal such that the reflected signals from different elements have mutually distinguishable features:

- In one aspect included in the preferred embodiment and relevant to minimizing the electronic support at the element, the reflection method include means for generating reflected signals with distinguishable complex envelope features including relative amplitude, delay or phase while maintaining the carrier frequency and relative carrier phase of each of the incident signals for at least the duration of one pseudo-noise sequence included in such incident signals;
- In one aspect included in the preferred embodiment and relevant for generating reflected signals with distinguishable features, the reflecting signal at each element having distinguishable spectrum features, including different amplitudes, phases or delays including cyclic-shift delays;
- In one aspect included in the preferred embodiment and relevant for subsequent correlation and detection operations, the reflecting signal at each element use different spread spectrum signals including spread spectrum signals with different integer-chip delays, including pseudo-noise sequences of a common base that repeat cyclically, each with a different cyclic shift-phase, including pseudo-noise sequences with the same base as the pseudo-noise sequences included in the incident signals;
- In one aspect included in the preferred embodiment and relevant for the orthogonal correlation of different pseudo-noise sequences included in the reflected signals, the reflecting signal at each element is a maximal-length sequence with different cyclic shift-phase that have the same base as the a maximal-length sequences included in the incident signal, each having a different cyclic-phase than the cyclic phases included in the incident signal;
- In one aspect included in the preferred embodiment and relevant for the practical realization of the reflecting signals at each element, the reflecting maximal-length sequence at each element is implemented using linear feedback shift register (LFSR) techniques in which the shift-register of each element is initialized at a different initial state, such an initial state corresponding to the cyclic shift-phase for such element;
- In one aspect included in the preferred embodiment and relevant for extracting the signal incident at each element or for performing the beamforming operation, the reflecting signal at each element include overlaying a random factor including selecting the ±1 sign or 180° phase-shill of the corresponding reflecting signal including means for programming the overall initial state of the LFSR at such an element;
- In one aspect included in the preferred embodiment and relevant for the simplification of the beamforming operations, the LFSR of every element included in the receive array is driven from a common clock signal synchronized with the clock signal used in the sample-and-hold device included in the analog-to-digital converter common for the entire array;
- In one aspect included in the preferred embodiment and relevant for range measurements, the clock that drives the generation of the reflecting sequences at each element, and the generation of the reflecting sequences themselves are synchronized with code epoch common for the whole array;
- In one aspect included in the preferred embodiment and relevant for maximizing the number of elements in the array, the transitions of the clock signal used to drive the LFSR at each element is off-phase with the transitions of the clock signal used in the sample-and-hold device included in the analog-to-digital converter common for the entire array.
- In one aspect included in the preferred embodiment and relevant for high-resolution of time ambiguities and for support of applications using short pulses as per descriptions of methods and procedures corresponding to FIG. 16, the chip clocks and the synchronization signals have characteristics compatible with the use of such short-duration pulses;
- In one aspect included in the preferred embodiment and relevant using a single LNA for the entire array and for minimizing the minimizing the hardware requirements at each element including overall volume, heat dissipation and power consumption, the code generation and reflecting is implemented using the code reflector method of FIG. 6 requiring no active RF hardware.

Reflected Signals

The following applies to the apparatus and method used to reflect the signals incident in the receive array object of this invention and with the method and means to combine such reflected signals such they can be collected at common point including the interface with the down-converter. In general, the receive array object of this invention includes a wireless or a wired means for combining the signals reflected at each element while generating a single multi-level aggregate signal at a common carrier frequency for the entire array:

- In one aspect relevant for the wireless combining of the reflected signals, such a signal reflection includes reflection through backscattering in which part of the incident signal at each element is reflected back due an impedance mismatch between the antenna element and the load circuit in which the reflecting signal is used to control such a load, including controlling the switching between different loads, or controlling the switching between loads subjected to different delays with such delays set or measured relative to the phase center of the corresponding antenna element, or controlling the resistance or impedance of variable resistance devices such as PIN diodes;
- In another aspect relevant for the wireless combining using signal reflection through backscattering at each element includes the use of surface acoustic wave (SAW) devices, including SAW devices with interdigital transducer and a set of wave reflectors that produce a unique sequence of reflected acoustic wave pulses that, after being converted to a sequence of radio pulses, including a pseudo noise sequence of such radio pulses, are transmitted back through the antenna element;
- In one aspect included in the preferred embodiment and relevant for using wired signal combiners such as a Wilkinson combiner, the signal reflection method includes devices that use the reflecting signal to control the amplitude and phase characteristics of the incident signal including devices that perform the multiplication or re-modulation of the incident signal by the reflecting signal at each element;
- In one aspect included in the preferred embodiment and relevant for reflecting signals that are binary such as maximal length sequences, the method used to multiply or re-modulate the incident signal by the reflecting signal includes the method described in conjunction with FIG. 6 that including the use of quadrature hybrids and reflecting the incident signal by 0° or 180° according to the ±1 values included in the reflecting signal;
- In one aspect included in the preferred embodiment and relevant to reducing the noise of such switching operations in the reflected signals includes using reflecting signals that are synchronized with sample-and-hold devices included in the analog-to-digital converter such a sampling being performed with a phase offset relative to consecutive switching times, including half-cycle between such consecutive switching times.

Digital Receiver

The following applies to the apparatus and method used to amplify, down-convert and sample the aggregate radio signal resulting from the combination of reflected signals. In general, such an aggregate signal has the same carrier frequency as the incident signal and a higher bandwidth:

- In one aspect included in the preferred embodiment and relevant for noise performance and equipment count or cost reduction, the aggregate radio signal resulting from either the wired or wireless combination of the reflected signal is fed to and processed by a single low noise amplifier followed by a single down-converter, such a down-converter used to create an intermediate-frequency signal or baseband signal corresponding to such an aggregate signal;
- In one aspect included in the preferred embodiment and relevant for noise performance and equipment count or cost reduction, the down-converted signal either at baseband or at an intermediate frequency is sampled while using a single or a pair of analog-to-digital converters operating at least at the Nyquist rate of the aggregated reflected signal, such analog-to-digital converter devices used to generate a complex-valued (i.e., in-phase and quadrature-phase) digitized discrete-time version of the aggregate signal suitable for processing by a general purpose computer or digital signal processor devices.

Correlator

The following applies to the correlation operations performed using the in-phase and quadrature-phase baseband samples of the aggregate signal that resulted from the combination of the reflected signals. In general, the signal at the output of the analog-to-digital converter results from the combination of multiple reflected signals, each reflected signal being a direct-sequence spread spectrum signal including at least one signal including at least one pseudo-noise sequence or code:

- In one aspect included in the preferred embodiment, the cyclic correlation operations are used to transform the resulting baseband sampled signal from the code-domain (i.e., spread spectrum) to the time-domain (i.e., time division multiplexing) while achieving spread spectrum processing gain. In the preferred embodiment, the signal that result at the output of the correlator is the discrete-time version of such a time-domain baseband signal corresponding to the radar waveform, analog sensor signal or modulated data signal included in the spread spectrum signal and used to spread the pseudo-noise sequences included in the incident signal;
- In one aspect included in the preferred embodiment, the resulting baseband signal is a code-domain signal that includes at least one code or cyclic shift of the maximal length sequence with ±1 chips and used as base sequence included in at least one of the incident signals;
- In one aspect included in the preferred implementation and relevant for the orthogonal detection of the spread spectrum codes included in the aggregate signal, the resulting baseband signal is correlated against all cyclic shifts of a modified version of the maximal length sequence used as base sequence and included in at least one of the incident signals, such a modified version of such a maximal-length sequence having each chip-position with a negative value replaced by a zero.

Signal Detection and Beamforming

The signal at the output of the correlator resulting from the correlating operations is a time-domain signal as it includes the baseband waveform, samples or modulated symbols used originally to spread the pseudo-noise sequences used to compose the transmitted spread spectrum signal. In certain embodiments, including embodiments in which the incident signals have different codes, such a time-domain signal at the output of the correlator is such that it can be spatially demultiplexed while using information of the angle-of-arrival of each incident signal:

In one aspect included in the preferred embodiment, the digital beamforming operations include the use of weights that include information of one, a set or all the incident angles from potential transmitters or targets, to separate signals incident at different angles while achieving array gain proportional to the number of elements;

In one aspect included in the preferred embodiment, the digital beamforming operations include the use of weights that include information of one, a set or all the incident angles, to generate antenna nulls in specific directions, including directions corresponding to the angles-of-arrival of selected incident signals.

In general, due to propagation channel memory including multipath, or when the transmitted signals include multiple codes, or the incident signals from different transmitters include at least one pseudo-noise sequence with a common cyclic shift-phase in at least two of such incident signals, the reflected signals by at least two of the elements include at least one pseudo-noise sequence with a common cyclic shift-phase or code:

In one aspect included in the preferred embodiment and relevant for performance maximization, the methods object of this invention include techniques for joint beamforming and detection include multiple hypothesis tests and inversion techniques including pseudo-inversion operations leveraging angle-of-arrival information or hypothesis, multipath signatures, additional beamforming weights including weights introduced at the reflecting sequences to maximize the noise performance of the joint detection methods using pseudo-inversion techniques.

In general, at least one of the incident signals are not chip-level synchronized with the reflecting signals of at least one element, generating corresponding reflected signals that include at least two codes with different code-shifts as per exemplary FIG. 7, each at least one sequence with different non sequential non-contiguous cyclic shifts, each sequence with different power. These different codes with different cyclic-shifts, after the correlating operations result in non-contiguous pulses (pulse splitting):

In one aspect included in the preferred embodiment and relevant for performance maximization, the methods object of this invention include using the relative position, form and power of such split pulses to estimate the signals received by each array element, or in inversion methods including pseudo-inversion techniques used to jointly determine the beamformed signals.

What is claimed is:

1. A method for receiving direct-sequence spread spectrum signals containing a plurality of codes with digital beamforming in a receive array apparatus composed of a plurality of spaced antenna elements coupled to at least one receiver with at least one low noise amplifier, at least one frequency down-converter and at least one analog-to-digital converter and at least one digital signal processing computer or device for said plurality of spaced antenna elements, the method comprising the steps of:

receiving said direct-sequence spread spectrum signals in said receive array apparatus, the signals emanating from a plurality of positions or from one or multiple transmitters;

multiplying said received signals at each element by a reflecting code to produce reflected signals hereinafter referred to as Element Reflected Signals;

combining said Element Reflected Signals forming a common signal for the array;

converting said common signal to a convenient intermediary frequency signal;

sampling said intermediary frequency-converted signal using said analog-to-digital converter;

correlating resulting samples against codes or variations of said codes included in said Element Reflected Signals;

demultiplexing said Element Reflected Signals to corresponding signals as received by each of said different array antenna elements using said correlated samples.

2. The method of claim 1, wherein said direct-sequence spread spectrum signal incident upon said receive array apparatus comprises at least one subset of codes with reflective properties derived from said plurality of codes included in said direct-sequence spread spectrum signal used in at least one of said spaced antenna elements.

3. The method of claim 2, wherein at least a portion of said subset of codes with reflected properties derived from said plurality of codes included in said direct-sequence spread spectrum signal is a row of a circulant matrix.

4. The method of claim 3 wherein each row in said circulant matrix is a different cyclic-shift of a common maximal-length sequence.

5. The method of claim 3, wherein at least two of said codes in said subset of codes are received from said plurality of positions or from one or multiple transmitters and wherein each of the two codes is a scaled version of said row of said circulant matrix.

6. The method of claim 5 wherein said scaled version used for each of said two codes contains a plurality of data bits corresponding to a complex-valued modulated symbol.

7. The method of claim 6 wherein said direct sequence spread spectrum signal incident upon said receive array apparatus includes signals from said plurality of positions of one or multiple transmitters each transmitter transmitting at least one modulated data symbol, each modulated data symbol corresponding to a scaling factor for at least one of said two codes from said plurality of positions of one or multiple transmitters and conveying information corresponding to one or more of said plurality data bits.

8. The method of claim 3 wherein said reflected signal is used in at least one of the antenna elements comprises said row of said circulant matrix.

9. The method of claim 3, wherein said circulant matrix is an orthogonal matrix.

10. The methods of claim 2, wherein the set of pulses including waveform transmitted in each chip time of the incident spread spectrum signal using orthogonal codes comprise a modulated data signal with modulations including Binary Phase Shift Keying (BPSK), Quadrature-Phase Shift Keying (QPSK), Offset Quadrature-Phase Shift Keying (OQPSK), M-ary Phase-Shift Keying (M-ary PSK) and M-ary Quadrature Amplitude Modulation (M-ary QAM) including differential forms of said modulations.

11. The methods of claim 2, wherein the set of pulses including waveform transmitted in each chip time of the incident spread spectrum signal using orthogonal codes comprise a signal linear frequency modulation (LFM) and orthogonal frequency modulation (OFDM) including cyclic padding.

12. The method of claim 1 wherein at least one of said incident signals upon said receive array apparatus from at least one of said plurality of positions of one or multiple transmitters include reflections, including multipath reflections from a plurality of stationary or moving objects.

13. The method of claim 1, wherein said reflecting signal of at least one antenna element has distinguishable temporal or spectrum features.

14. The methods of claim 1 wherein each of said reflected signals is circulating and does not include a maximal-length sequence included in said received signals.

15. The method of claim 1, wherein at least one of said Element Reflected Signals is generated by multiplication or re-modulation of the signal incident upon a corresponding antenna element by said reflecting signal at said corresponding antenna element.

16. The methods of claim 1 wherein said step of combining a plurality of Element Reflected Signals is performed utilizing at least one RF transmission line.

17. The methods of claim 1 wherein said reflected signals from said plurality of spaced antenna elements are combined using a microwave signal combiner including a Wilkinson combiner.

18. The methods of claim 1 wherein said reflected signals propagate away from the corresponding antenna element by backscattering and combine wirelessly at a location remote from said corresponding antenna elements.

19. The method of claim 1 wherein said reflected signal of at least one antenna element results from an impedance mismatch between said antenna element and said antenna's load circuit.

20. The method of claim 19 further comprising the step of controlling said antenna element load impedance, utilizing said reflecting signal.

21. The method of claim 1 wherein said reflected signals are generated using surface acoustic wave (SAW) devices.

22. The method of claim 1, wherein at least one of said digital receivers for said entire spread spectrum antenna array is used to amplify down-convert and sample the aggregate signal resulting from the combination of said reflected signals.

23. The methods of claim 1 further comprising the step of synchronizing said reflecting signals with sample-and-hold devices included in said analog-to-digital converter.

24. The methods of claim 1 wherein said analog-to-digital converter produces at least one complex-valued sample per spread spectrum chip time.

25. The method of claim 1, wherein said correlator apparatus including software operations is used to demultiplex and detect beamforming-bearing information for said plurality of antenna elements and included in aggregate signal that results from the combination of said reflected signals.

26. The methods of claim 25, wherein said software operations include digital codes used in said correlator apparatus are derived from maximal length sequences included in said incident signals.

27. The methods of claim 26, wherein said correlator apparatus performs select and add operations.

28. The methods of claim 26 wherein said correlator apparatus further comprises the step of selecting only the sample positions corresponding to positive values of said correlator apparatus cyclically shifting said maximal length sequences.

29. The method of claim 1 wherein said step of generating a received beamformed signal further comprises isolating or nulling at least one of said beamformed signals.

30. The method of claim 25 wherein said step of detecting beamforming-bearing information for said plurality of antenna elements comprises joint detection of said direction-bearing parameters and data included in the signals incident upon said array apparatus.

31. The methods of claim 29 wherein said received beamformed signal forms nulls toward at least one specified angular directions, including directions of at least one of said beamformed incident signals.

32. The methods of claim 29 wherein said step of generating a received beamformed signal further comprises the step of joint detection of modulated symbols, complex-valued samples, complex-valued data and multipath-bearing information included in said incident signals.

33. The method of claim 25, wherein said demultiplexed signals resulting from said correlations operations uses said orthogonal codes included in the reflected signals result without cross-interference between said plurality of antenna elements.

34. The method of claim 25, wherein said orthogonal code used in said correlation operations uniquely identify a specific antenna element from said plurality of antenna elements of said receiver array.

35. The method of claim 23, wherein said sampled aggregate signal for said antenna array comprises a fixed number of sample phases per chip time.

36. The method of claim 23, wherein said sampled aggregate signal for said antenna array is partitioned according to corresponding sample phases per chip time with said resulting partition having as many samples as the number of chips per code of the incident spread spectrum signal.

37. The method of claim 25, wherein said correlation operations are performed using each partition of said sampled aggregate signal such that said demultiplexed detected signal for each element of said antenna array results is oversampled with as many samples as the number of samples per chip time.

38. The method of claim 9, wherein each row of said circulant matrix is a different cyclic-shift of a common maximal-length sequence.

39. The method of claim 38, wherein said rows of said circulant matrix corresponding to codes included in the signals incident in the receive array have values ±1.

40. The method of claim 38, wherein said rows of said circulant matrix corresponding to said reflecting or re-modulating codes in at least one element including all elements of said receive array have values 1 and zero.

41. The method of claim 40, wherein said correlation operations used to demultiplex said signals as received at each element of said receive array are performed using select-and-add operations.

42. The method of claim 41, wherein said correlation results from addition operations using just the sample positions corresponding to positive values of said cyclically shifted maximal length sequences.

\* \* \* \* \*